United States Patent Office 3,213,358
Patented Oct. 19, 1965

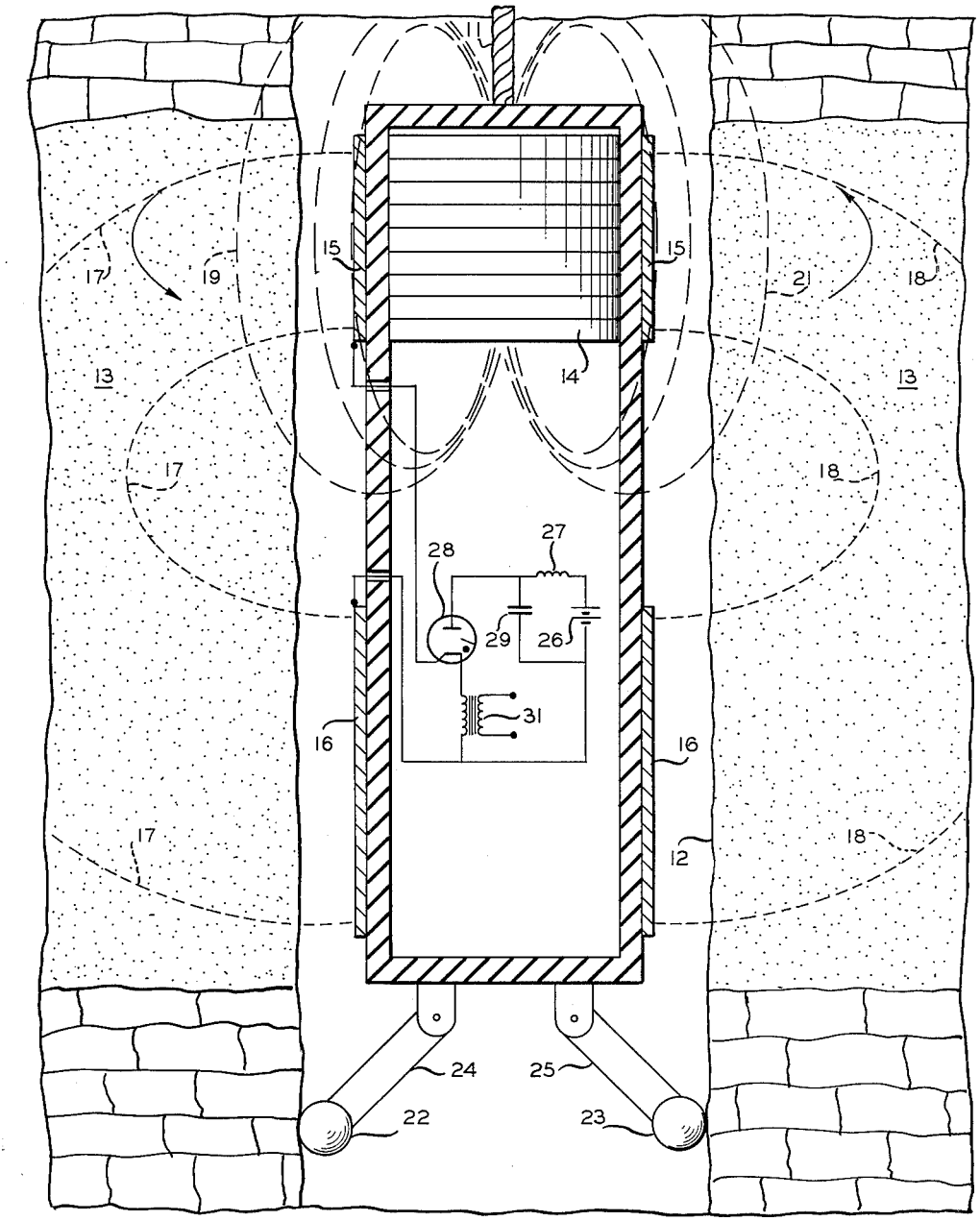

3,213,358
METHOD AND APPARATUS FOR GENERATING AND DETECTING SHEAR WAVES IN EARTH FORMATIONS
Raymond G. Piety, Bartlesville, Okla., assignor to Phillips Petroleum Company, a corporation of Delaware
Filed Mar. 8, 1962, Ser. No. 178,423
7 Claims. (Cl. 324—10)

This invention relates to method and apparatus for generating shear waves. In one aspect the invention relates to novel method and apparatus for producing shear waves in an earth formation. In another aspect the invention relates to method and apparatus for generating shear waves in a formation about a bore hole. In another aspect the invention relates to method and apparatus for determining a characteristic of an earth formation. In another aspect the invention relates to the generation of axial shear waves in a bore hole.

As a means of obtaining information concerning the characteristics of a formation surrounding a bore hole, it has been found to be desirable to generate a shear wave in the bore hole adjacent the formation with a minimum of dilatational or compressional wave disturbance. Since compressional waves have a higher velocity than shear waves, if they are simultaneously generated with shear waves, the compressional waves will arrive at the detector ahead of the shear waves. Even with a detector which discriminates against compressional waves difficulties will arise because of compressional to shear wave conversion.

This invention presents a solution to the problem of generating shear waves in a bore hole with a minimum of compressional wave interference. The type of shear wave to be generated is one in which the formation around the bore hole is vibrated rotationally around the axis of the bore hole. A rotational force will be exerted on the formations surrounding the bore hole upon the creation of a magnetic field in the formations parallel to the axis of the bore hole and the generation of a pulse of electric current which flows radially away from the bore hole. The electromagnetic principle governing this phenomena is that the force per unit volume is equal to the current density times the magnetic field. The force is perpendicular to a plane containing the magnetic field vector and the current density vector. The sine of the angle between these two vectors is a multiplicative factor which is unity when the vectors are perpendicular. Thus for a current density of ten amperes and a magnetic field of one gauss, there is one dyne of force per cubic centimeter.

Accordingly it is an object of the invention to provide new and improved method and apparatus for generating shear waves in the formations surrounding a bore hole. An object of the invention is to determine a characteristic of a formation surrounding a bore hole. Another object of the invention is to generate axial shear waves in a bore hole. Yet another object of the invention is to provide method and apparatus for generating shear waves with a minimum of compressional wave interference.

Other aspects, objects and advantages of the invention will be apparent from a study of the disclosure, the drawing and the appended claims.

Referring now to the drawing there is shown a schematic representation of one embodiment of a shear wave generating and detecting sonde in accordance with the invention, comprising a casing 10 of electrical insulating material suspended by a cable 11 in bore hole 12 adjacent a formation 13. A large cylindrical magnet 14, having a high coercive force, is located in casing 10. Magnet 14 can be of any suitable material, such as Arnox V which is a ceramic permanent magnet material composed of highly oriented barium ferrite having high coercive force, manufactured by Arnold Engineering Company, Marengo, Illinois. Magnet 14 can be composed of a plurality of individual discs for ease of magnetization. A coercive force of at least 1000 oersteds is desirable and a coercive force of at least 2000 oersteds is preferred. Cylindrical metallic conductor electrodes 15 and 16 are mounted on the exterior of casing 10 to establish lines of current flow 17 and 18 perpendicular to the lines 19 and 21 of the magnetic field of magnet 14. Electrodes 15 and 16 can be separated by any suitable distance, such as on the order of five feet. The current flow can be generated by the discharge of a capacitor. In applications where an oscillatory discharge is desirable, it can be generated by utilizing an inductance in series with the capacitor or by discharging two capacitors in succession with reversed charges on the capacitors. Such a reversal would reduce polarization effects due to successive discharges in the same direction. Electrode 16 can be larger than electrode 15 in order to lower the resistance of the ground return and reduce the power consumption.

The force vector resulting from current flow lines 17 and magnetic field lines 19 will be perpendicular to the plane of the drawing and directed upwardly from the drawing while the force vector resulting from current flow lines 18 and magnetic field lines 21 will be perpendicular to the plane of the drawing and directed downwardly into the drawing. Thus the discharge between electrodes 15 and 16 will set up a torque on formation 13 causing circular motion of formation 13 about the axis of bore hole 12. The resulting shear wave will propagate outwardly from this source. The measurements of the time interval between the initiation of the shear wave and the detection of the shear wave is a function of the velocity of the shear wave in the formation. Any suitable detector, such as rotationally sensitive seismometers 22 and 23, can be utilized to detect the shear wave. Seismometers 22 and 23 can be positioned against the wall of bore hole 12 by any suitable means, such as spring actuated arms 24 and 25, respectively. Seismometers 22 and 23 can be any suitable device, such as the moving coil dynamic seismometer. The seismometers can be connected in opposite phase so that the rotational motion will cause the two voltages to add. The time interval can be measured by noting and/or recording the time of the application of the initiation signal to the primary winding of transformer 31 and the detection of the shear wave by seismometers 22 and 23, or by utilizing two or more seismometers spaced apart vertically.

A suitable means for supplying the current pulse is the triggered spark gap manufactured by Edgerton, Germeshausen and Gries, Inc. of Boston, Massachusetts; which comprises a high voltage D.C. power supply 26 connected in series with inductance 27 between ground and the anode of triggered spark gap tube 28. High voltage D.C. power supply 26 can be located in casing 10 or on surface of the earth. A capacitor 29 is connected in parallel with power supply 26 and inductance 27. The secondary winding of transformer 31 is connected between electrode 16 and the trigger electrode of tube 28 while means for applying an initiation signal is connected across the primary winding of transformer 31. The means for applying the initiation signal can be located in casing 10 and actuated by any suitable means from the surface of the earth or timing means or other suitable means can be contained in casing 10 to actuate the means for applying. One suitable system is a switch to connect a voltage source across the primary winding of transformer 31. The switch can be actuated by a timing means contained in casing 10 or by a signal from the surface of the earth. Upon the application of an initiation signal to the primary winding of transformer 31, capacitor 29 discharges through electrode 15 and formation 13 to electrode 16.

Electrodes 15 and 16 can be mounted against the exterior surface of casing 10, or mounted on spring actuated arms to hold the electrodes in contact with the wall of bore hole 12.

Reasonable variation and modification are possible within the scope of the foregoing disclosure, the drawing, and the appended claims to the invention.

I claim:

1. A well logging system for measuring properties of formation adjacent a borehole, comprising a casing made of electrically insulating material and adapted to be lowered into the bore hole, a magnet having a high coercive force positioned in said casing so as to produce a magnetic field in said formation parallel to the axis of the bore hole, a first cylindrical metallic conductor electrode mounted on the exterior of said casing adjacent said magnet, a second cylindrical metallic conductor electrode mounted on the exterior of said casing and spaced from said first electrode, means for causing a pulse of current to pass from one of said first and second electrodes through and substantially perpendicular to said magnetic field to the other of said first and second electrodes to cause circular motion of said formation about the axis of said bore hole, and detecting means mounted on said casing and spaced from said first and second electrodes for contacting the formation adjacent said detecting means to detect said circular motion of said formation.

2. Apparatus in accordance with claim 1 wherein said means for causing comprises a triggered spark gap having an anode, a cathode and a trigger electrode; a high voltage D.C. power supply and an inductance connected in series between said anode of said triggered spark gap and said second electrode; a capacitor connected in parallel with said power supply and said inductance; a transformer; means connecting the secondary winding of said transformer between said trigger electrode of said triggered spark gap and said second electrode; means connected across the primary winding of said transformer to apply an initiating signal thereto; and means connecting said first electrode to said cathode of said triggered spark gap.

3. Apparatus in accordance with claim 1 wherein said detecting means comprises at least one seismometer.

4. Apparatus in accordance with claim 1 wherein said detecting means comprises two seismometers mounted on opposite sides of said casing and connected in opposite phase so that the output voltages of said seismometers caused by the rotational motion of the formation will add.

5. Apparatus for measuring properties of a formation surrounding a bore hole comprising a casing adapted to be lowered into the bore hole, means positioned in said casing to produce a magnetic field in said formation parallel to the axis of the bore hole, a first electrode mounted on the exterior of said casing adjacent said means, a second electrode mounted on the exterior of said casing and spaced from said first electrode, means for causing a pulse of current to pass from one of said first and second electrodes through and substantially perpendicular to said magnetic field to the other of said first and second electrodes to cause circular motion of said formation about the axis of said bore hole, and detecting means spaced from said first and second electrodes for detecting said circular motion of said formation.

6. A method of measuring properties of formation adjacent a bore hole comprising establishing a magnetic field at a first point in the formation parallel to the axis of the bore hole, passing electrical current radially into said formation from said bore hole at said first point and through and substantially perpendicular to said magnetic field to cause circular motion of said formation about the axis of said bore hole, and detecting the movement of the formation at a second point spaced from said first point.

7. A method in accordance with claim 6 wherein said step of detecting comprises producing first and second signals respectively responsive to the movement of the formation on opposite sides of the bore hole at said second point, and further comprising adding said first and second signals.

References Cited by the Examiner

UNITED STATES PATENTS

| | | | |
|---|---|---|---|
| 2,723,374 | 11/55 | Williams | 324—6 |
| 3,076,928 | 2/63 | Waters | 324—6 X |
| 3,079,550 | 2/63 | Huddleston et al. | 324—6 X |
| 3,124,742 | 3/64 | Schneider | 324—10 X |

WALTER L. CARLSON, *Primary Examiner.*

JAMES W. LAWRENCE, *Examiner.*